(12) United States Patent
Weiss

(10) Patent No.: US 8,662,881 B2
(45) Date of Patent: Mar. 4, 2014

(54) STRETCH-BLOW MOLDING MACHINE

(75) Inventor: Johannes Weiss, Nittenau (DE)

(73) Assignee: Krones AG, Neutraubling (DE)

( * ) Notice: Subject to any disclaimer, the term of this patent is extended or adjusted under 35 U.S.C. 154(b) by 421 days.

(21) Appl. No.: 13/093,010

(22) Filed: Apr. 25, 2011

(65) Prior Publication Data

US 2011/0262576 A1    Oct. 27, 2011

(30) Foreign Application Priority Data

Apr. 27, 2010   (DE) .......................... 10 2010 028 254

(51) Int. Cl.
*B29C 49/00*     (2006.01)
(52) U.S. Cl.
USPC ........................................................ 425/529
(58) Field of Classification Search
USPC ................................................ 425/182, 529
See application file for complete search history.

(56) References Cited

U.S. PATENT DOCUMENTS

| | | | |
|---|---|---|---|
| 2007/0039370 A1* | 2/2007 | Kruger et al. .................... | 72/451 |
| 2007/0108157 A1* | 5/2007 | Dupuis et al. .................. | 215/379 |
| 2010/0078861 A1* | 4/2010 | Herklotz et al. ............... | 264/532 |
| 2010/0159056 A1* | 6/2010 | Toutoux et al. ............... | 425/150 |

FOREIGN PATENT DOCUMENTS

| | | |
|---|---|---|
| DE | 10325229 A1 | 12/2004 |
| DE | 102005040905 A1 | 10/2006 |
| DE | 102005045942 A1 | 4/2007 |
| DE | 602004007292 T2 | 3/2008 |
| DE | 102007008023 A1 | 8/2008 |
| DE | 102007049283 A1 | 4/2009 |
| EP | 1694492 A1 | 8/2006 |
| WO | WO-2006/108380 A2 | 10/2006 |
| WO | WO-2007020355 A1 | 2/2007 |
| WO | WO-2008/098565 A2 | 8/2008 |
| WO | WO-2010057325 A1 | 5/2010 |

OTHER PUBLICATIONS

European Search Report for EP 11 15 9414, dated Jan. 4, 2013.
Search Report for German Application No. 10 2010 028 254.5 dated Oct. 27, 2010.

* cited by examiner

*Primary Examiner* — Amjad Abraham
*Assistant Examiner* — Ninh Le
(74) *Attorney, Agent, or Firm* — Marshall, Gerstein & Borun LLP

(57) ABSTRACT

A stretch-blow molding machine with at least one blow molding station, where for electric stretching, at least one stretching rod is coupled with a drive unit comprising an electric servomotor, and the stretching rod can be changed in a defined, at least approximately axial direction, and has a stretching rod quick change device transferable between a centered operating position and a change position.

15 Claims, 4 Drawing Sheets

STRETCH-BLOW MOLDING MACHINE

CROSS-REFERENCE TO RELATED APPLICATION

The present application claims the benefit of priority of German Patent Application No. 102010028254.5 filed Apr. 27, 2010. The entire text of the priority application is incorporated herein by reference in its entirety.

FIELD OF THE DISCLOSURE

The disclosure relates to a stretch-blow molding.

BACKGROUND

In a stretch-blow molding machine known from DE 10325229 A, an electric linear drive is provided for positioning the stretching rod in electric stretching. To be able to change the stretching rod, the electric linear drive must be dismounted.

In the stretch-blow molding machine known from WO 2006/108380 A, the stretching rod is positioned by an electric linear motor and additionally by a fluid drive. The stretching rod is retained in a stretching slide. A releasable coupling is provided between the stretching rod and either an extension element or a rotor of the linear motor. Time-consuming reset works are required for changing a stretching rod.

In the stretch-blow molding machine known from DE 102005045942 A, the stretching rod movement is cam-controlled, where positioning can be additionally accomplished electrically. A coupling device is arranged at the stretching slide.

In the stretch-blow molding machine known from EP 1694492 A, the stretching rod is releasably connected with the stretching slide via a bayonet-type coupling. The stretching rod is positioned by cam control of the stretching slide. The stretching slide comprises a hollow housing into which a head portion with two ears mounted to the stretching rod can be inserted linearly and locked by rotary motion about the stretching rod axis. The handling of this is complicated.

SUMMARY OF THE DISCLOSURE

One aspect of the disclosure is to provide a stretch-blow molding machine of the type mentioned above wherein the stretching rod can be comfortably changed at any time despite the drive unit with the electric servomotor for electric stretching which blocks or restricts the path of movement of the stretching rod when the stretching rod is changed.

The stretching rod quick change device permits a comfortable change of the stretching rod at any time as soon as it has been transferred to the change position, although the drive unit and/or the servomotor for electric stretching in the operating position blocks or at least restricts the path of movement of the stretching rod when it is changed.

In one suitable embodiment, the coupling is designed such that it can be disconnected for transferring the stretching rod quick change device to the change position, and the drive unit with the electric servomotor is mounted, at least in a region adjacent to the coupling, such that it can be displaced from the path of movement of the stretching rod in the direction of change. During the transfer of the stretching rod quick change device to the change position, not only the stretching rod is released to be changed by disconnecting the coupling, but the drive unit with the servomotor is moreover displaced out of the path of movement of the stretching rod so that the stretching rod can be comfortably changed. The functional combination of the disconnectable coupling and the displaceable drive unit thus eliminates in a structurally simple way the impairment caused by the drive unit with the electric servomotor which is inherent in a blow molding station designed for electric stretching.

In one suitable embodiment, the stretching rod quick change device can be transferred manually, possibly even without any auxiliaries. As an alternative, a partially manual and partially actuator-operated transfer is possible, or even an all-automatic remote-controlled actuator operation of the transfer, so that the stretching rod is very quickly released to be easily accessible for changing it comfortably.

It is advantageous for the drive unit with the servomotor to be mounted at a bearing support of the blow molding station so that it can be displaced. The bearing support can comprise a linear guidance for a stretching slide at which the stretching rod is retained so that it can be changed. The displacement can be accomplished by folding or swiveling or shifting, where these motion sequences can optionally also be combined. The assembly of the drive unit with the servomotor permitting the displacement is suitably designed such that the displaced drive unit with the servomotor still remains at the bearing support and accordingly does not have to be dismounted completely.

In one suitable embodiment, an assembly device for the drive unit secured against folding and/or swiveling and/or shifting the drive unit by a releasable locking means is provided at the bearing support, preferably a hinged axis for the drive unit or the servomotor, respectively, which preferably is parallel or perpendicular or inclined relative to the direction of the axis of the stretching rod and thus to the path of movement of the stretching rod during the change. This permits a guided displacement motion for comfortably changing the stretching rod. The hinged axis and the locking means together fix the drive unit with the servomotor in the operating position stably enough for the relatively high reaction forces from stretching rod positioning are securely introduced into the bearing support.

In one suitable embodiment, the coupling is centered in the operating position and free from backlash, so that no falsifying backlash can occur during stretching rod positioning.

In one suitable embodiment, the stretching rod is placed in the operating position in a taper mounting in the stretching slide which performs a stable and centered positioning of the stretching rod. Aligned muff-like male taper pieces are arranged at the drive unit and at the stretching slide, between which a stretching rod head portion is clamped by means of a releasable clamping element acting at both male taper pieces in the operating position. The cooperation between the taper mounting in the stretching slide, its linear guidance, and the clamping of the male taper pieces over the clamping element secure the required centered and backlash-free coupling. Here, between the male taper pieces and the clamping element, tapering fitting surfaces are suitably clamped against each other, resulting in an automatic centering.

Suitably, at least one elastic connecting member is compressed between the stretching rod head portion and at least one male taper piece while the stretching rod head portion is clamped. This elastic connecting member can be an elastomer ring which, in the compressed state, generates a prestress advantageous for the centering and zero backlash. On the other hand, the elastic connecting member possibly abets, after the clamping element has been released, a release of the stretching rod in the taper mounting of the stretching slide, no that the stretching rod can be easily changed.

In a structurally simple embodiment, the clamping element is an at least two-piece quick acting ring which is closed by means of its dead-center exceeding clamp clip and cannot automatically work loose under operation-conditioned vibrations or forces. The dead-center exceeding clamp clip for example generates. in cooperation with the elastic connecting member, the required prestress for perfect centering and zero backlash.

In a structurally simple embodiment, the stretching rod head portion is a disk mounted on the end of the stretching rod, and the clamping element is preferably mounted directly to the disk. The clamping element is removed together with the stretching rod when the stretching rod is changed. As an alternative, the clamping element could also be attached in such a way that it remains at the drive unit or the stretching slide.

To ensure an unhindered possible access for changing the stretching rod in the change position, the drive unit can be displaced with the male taper piece from the operating position by at least half the outer diameter of the male taper piece into a lateral change position relative to the stretching rod axis. Suitably, the drive unit is displaced even further away to also expose a lateral comfortable access to the stretching rod head portion.

In a suitable embodiment, for electric stretching, the servomotor is a linear motor with a rotor that is, in the operating position, coaxial to the stretching rod axis or laterally offset by no more than 100 mm. The rotor is coupled with the stretching rod directly or via an extension when the clamping element is closed. Coaxial placing of the linear motor avoids undesired clamping forces between the stretching slide and the linear guidance. Even in case of a lateral offset of the rotor up to no more than 100 mm, the lateral forces between the stretching slide and the linear guidance are only moderate. In any case, by the displacement of the drive unit with the servomotor during the transfer of the stretching rod quick change device to the change position, enough space is exposed to be able to comfortably change the stretching rod.

In another embodiment, the servomotor is a rotary motor for electric stretching which is coupled with the stretching rod via a coaxial or laterally offset threaded spindle. The rotary motion of the rotary motor is converted into the linear movement of the stretching rod via the threaded spindle to position it. As due to the high forces it is sought to position the threaded spindle coaxially or only slightly laterally offset to the stretching rod, this would complicate a change of the stretching rod. As, however, during the change the servomotor with the drive unit and the threaded spindle can be displaced out of the path of movement of the stretching rod, the drive unit with the rotary servo motor can be nevertheless advantageously positioned in the blow molding station.

In one suitable embodiment, a swivel axis at least essentially parallel to the stretching rod is arranged at the bearing support laterally offset with respect to the stretching rod about which the drive unit with the servomotor is displaced during the transfer to the change position, and the swivel locking means is mounted at the bearing support at the side opposite to the swivel axis with respect to the stretching rod, so that it acts there at the servomotor and the latter is stably supported in the operating position.

In one suitable embodiment, a media supply is mounted at the stretching slide adjacent to the male taper piece of the coupling. In this embodiment, for example a working medium or another medium can be introduced into the then hollow stretching rod, if required, without thereby interfering with a comfortable change of the stretching rod.

In one suitable embodiment, the linear guidance for the stretching slide is a T-shaped dovetail rail at the bearing support on which a base part Fixed to the stretching slide is guided with a form-fit. This linear guidance requires little maintenance and is largely free from backlash, and it is insensitive to cleansing agents. Expensive, maintenance-intensive linear ball guides which are dirty due to the use of lubricants can be omitted as linear sliding bearings can be used due to force ratios that generate less friction. Generally, one can even dispense with lubricants, resulting in advantages for food in view of improved hygiene. Such linear slideways are furthermore lighter, more resistant to dirt, quieter, not susceptible to shocks and even bear pressure washing.

In one suitable embodiment, the servomotor is in the operating position additionally positively locked at the bearing support in the moving direction parallel to the stretching rod. This locking prevents relative movements of the servomotor at the bearing support even under maximum forces.

A stretching slide catch means is furthermore suitably provided at the bearing support which secures the stretching slide in the change position against automatic displacement as soon as the coupling is disconnected and the drive unit with the servomotor is possibly already displaced. During the change of the stretching rod, the stretching slide remains in the fixed position, so that during the transfer of the stretching rod change device to the operating position, the coupling is immediately ready again for being fixed. Advantageously, the catch means cooperates with at least one permanent magnet which becomes effective in an end position of the stretching slide. As an alternative, other catch means for the stretching slide which can be possibly only engaged for the change of the stretching rod can be provided.

BRIEF DESCRIPTION OF THE DRAWINGS

The subject matter of the disclosure will be explained with reference to the drawing. In the drawing.

DETAILED DESCRIPTION OF THE PREFERRED EMBODIMENT

Figure 1:
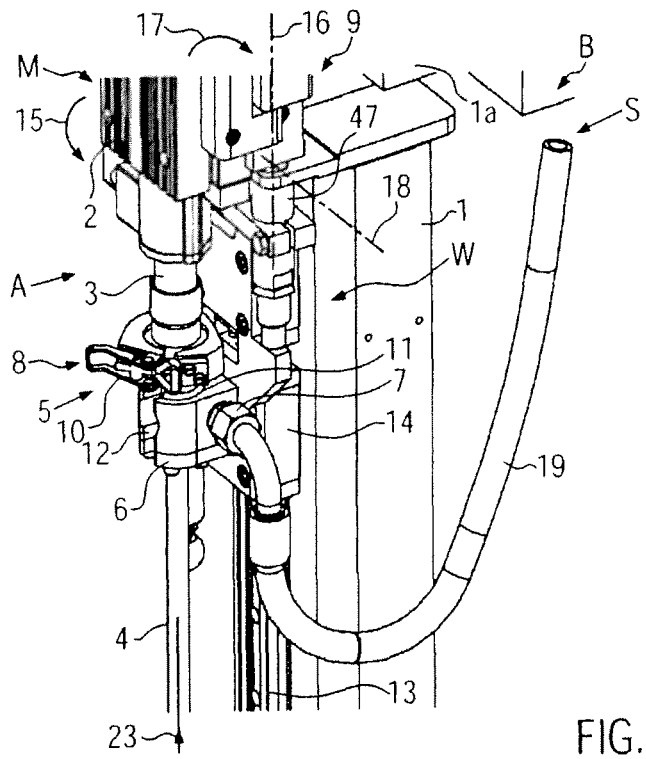
FIG. 1 shows a perspective view of a part of a blow molding station of a stretch-blow molding machine in an operating position.

In FIGS. 1-6, a portion of a blow molding station S of a stretch-blow molding machine B is illustrated in which a stretching rod quick change device W is provided which on the one hand provides a stable, centered backlash-free and quickly releasable connection between a drive unit A with a servomotor M and a stretching rod 4 which can electrically stretch preforms in a non-depicted blow mold, and which on the other hand permits at any time a comfortable and quick change of the stretching rod without having to dismount components of the blow molding station S, despite the spatial restriction given due to the stretching slide 6 and the drive unit when the stretching rod 4 is changed in a given direction of change 23.

The principle according to the disclosure is not only applicable to stretch-blow molding machines where in the production operation in most cases several blow molding stations S rotate on a blow-molding unit (not shown) relative to a stationary part, but also to stretch-blow molding machines with stationary blow molding stations. A change of a stretching rod becomes necessary, for example, in case of a change of the types of preforms or blow molds, respectively, or in case a medium must be introduced into the blow mold through the stretching rod 4, or for example for a so-called hotfill application. This is because the stretching rod 4 is usually guided to be linearly displaced in a blow nozzle and/or a valve block (not shown) with its end region immersing in the blow mold, and it penetrates a stretching slide 6, so that a change is only possible if the stretching rod 4 can be moved past the drive unit A at a sufficient distance.

A bearing support 1, optionally with a bearing support top part 1a, is mounted in the blow molding station S, to which bearing support not only the servomotor M with the drive unit A is mounted, but, in the shown embodiment, also a linear guidance 13 for the stretching slide 6 movable with the stretching rod 4 in the production operation is attached. In FIGS. 1-6 one assumes that the electric servomotor M is a linear motor 2 with a linearly movable rotor 3 which extends coaxially to the stretching rod 4 and is connected with the stretching rod 4 via a releasable coupling 5 at the stretching slide 6. As an alternative (not shown), the rotor 3 could be placed at the bearing support 1 with a slight lateral offset by no more than 100 m with respect to the stretching rod 4. Furthermore, an intermediate element could be alternatively provided between the rotor 3 and the stretching rod 4.

The principle of the stretching rod quick change device W according to the disclosure, however, can also be applied to stretch-blow molding machines wherein in the blow molding station S, a rotary motor is provided as electric servomotor M which controls the movement of the stretching rod, for example, via a screw spindle, wherein the screw spindle could be placed either coaxially with respect to the stretching rod 4 or somewhat laterally offset with respect to it. The screw spindle is here suitably also supported at the bearing support 1 (not shown).

In FIG. 1, a medium supply point 7 is mounted at the stretching slide 6 as an option by means of which a medium can be introduced into the preforms or the blow mold, respectively, through the in this case hollow stretching rod 4 in certain applications. The medium supply point 7 is fed, for example, via a delivery hose 19 movable along with the stretching slide 6.

The stretching rod quick change device W essentially comprises two groups of components, that is a clamp system 8 forming the coupling 5, which in the released state permits a relative movement of the drive unit A with the servomotor M relative to the stretching rod 4, and an assembly device 9 which in the released state of the clamp system 8 permits a displacement of the drive unit A with the servomotor M at the bearing support 1 out of the change path of movement of the stretching rod 4 without dismounting any components.

One important part of the clamp system 8 is a clamping element 10 for releasable coupling, here of the stretching slide 6 with the rotor 3 which is illustrated in detail with reference to FIGS. 2 and 4. A taper mounting 11 is contained in the stretching slide 6 for positioning an upper end 29 (FIG. 2) of the stretching rod 4 in the stretching slide 6 free from backlash, where the stretching slide 6 is suitably slotted at the side facing away from the bearing support 1 (slot 12). The stretching slide 6 is connected with a base part 14 which is guided in a form-fit on the linear guidance 13. The assembly device 9 for example defines a swivel axis 16 which in the shown embodiment extends laterally offset with respect to the stretching rod 4 at the bearing support 1 or at the bearing block top part 1a, and about which the drive unit A with the servomotor M can be displaced in the direction of an arrow 15 from the operating position shown in FIG. 1 to a change position (FIG. 6) to clear the path of movement of the stretching rod 4 in the given direction of change 23. The swivel axis 16 for example extends into a holder 47 mounted at the bearing support 1 or at the bearing support top part 1a, respectively.

In an alternative embodiment which is only indicated, a swivel axis 18 for the drive unit A with the servomotor M essentially extending vertically with respect to the stretching rod 4 is defined at the bearing support 1 to displace the drive unit A with the servomotor M for example in the direction of an arrow 17 from the operating position shown in FIG. 1 to the change position. In another alternative, a swivel axis inclined relative to the stretching rod 4 (not shown) could be defined at the bearing support 1. Furthermore, the drive unit A with the servomotor M could be shifted laterally, or diagonally, or displaced at the bearing support 1 in another way.

The stretching rod quick change device W can be operated either only manually, or partially manually and partially by an actuator, or all-automatically by an actuator to reduce reset times during a change of the stretching rod.

Figure 5:
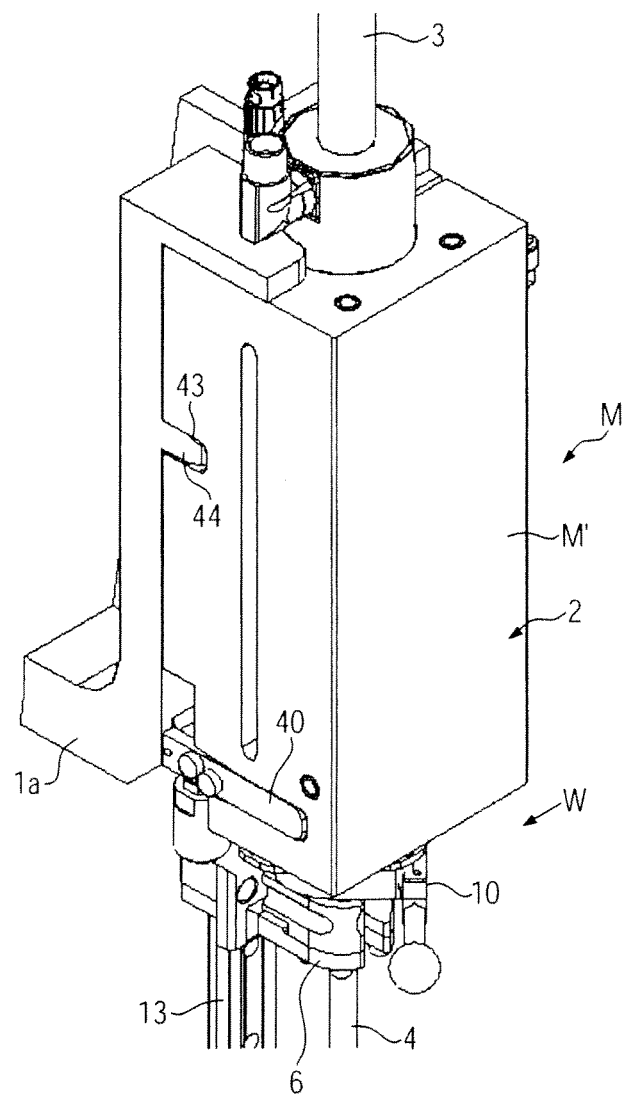
FIG. 5 shows a view similar to that of FIG. 1 with a changed viewing direction and in the operating position.

In the embodiment in FIGS. 1 and 5, an anti-swivel protection of the drive unit A or the servomotor M about the swivel axis 16, for example by means of a projection 40 at the bearing support 1 or the bearing block top part 1a, is provided which engages in a corresponding recess 40a in the servomotor M or in a heat sink M' accommodating the same in the operating position (FIG. 5) and locks the operating position by means of a locking element 41. The locking mechanism 41 can be released, for example, by an access opening 41a situated at the bottom in FIG. 6.

In FIG. 1, a guidance 20 for the rotor 3 is furthermore indicated at the linear motor 2, which guidance is here mounted at the lower end of the housing or stator of the linear motor 2 and guides the rotor 3 free from backlash and to be movable linearly.

Figure 2:
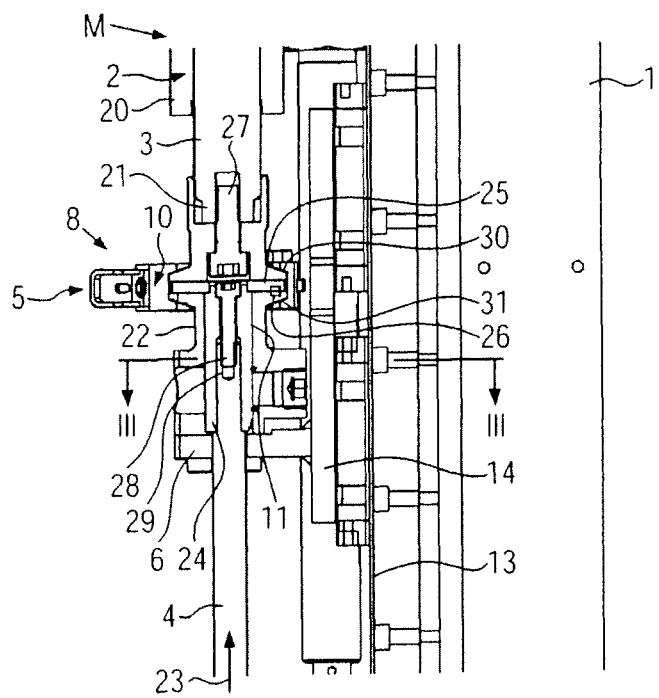
FIG. 2 shows a longitudinal section to FIG.

The schematic longitudinal sectional representation in FIG. 2 shows a male taper piece 21 at the lower end of the rotor 3, which in FIG. 2 is fixed by means of a mounting screw 27 (or as an alternative integrally formed with the rotor 1) and comprises an external, upper, annular taper surface 30. Another male taper piece 22 is attached to the stretching slide 6 and preferably integrally formed, which is optionally longitudinally slotted, just as the stretching slide 6, at the side facing away from the bearing support 1 and comprises a lower, external, nearly annular taper surface 31 which is inclined in a direction opposite to the taper surface 30 of the male taper piece 21 at the rotor 3. A fitting sleeve 24 is pushed onto the upper end 29 of the stretching rod 4 and supports an annular disk 25 as a stretching rod head portion and fixes it by means of a bolt 28 (or is integrally formed with the stretching rod 4). The fitting sleeve 24 is, in the operating position shown in FIG. 2, centered in the taper mounting 11 of the stretching slide 6 and fixed free from backlash. The annular disk 25 is clamped between the two male taper pieces 21, 22 by the clamping element 10 which acts with inner annular taper surfaces 39 (FIG. 4) at the taper surfaces 30, 31 of the male taper pieces 21, 22 and centers them relative to each other and clamps them together. Between the disk 25 and at least one male taper piece 22, an elastic element 26 can be optionally provided, preferably an elastomer ring, which is compressed in the operating position by the tensioning force of the clamping element 10 and supports the clamping effect.

Figure 3:
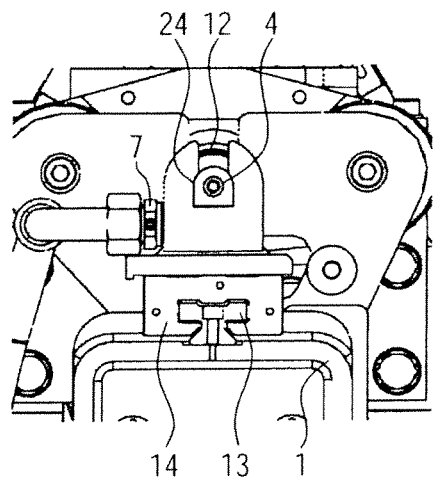
FIG. 3 shows a partial sectional representation in the cutting plane III-III in FIG. 2.

FIG. 3 (section in the plane III-III in FIG. 2) illustrates the form-fit between the fitting sleeve 24 and the stretching slide 6, and it also shows the slot 12 in the stretching slide 6 (and optionally the male taper piece 22). The fitting sleeve 24, for example, has a semicylindrical cross-section flattened at one peripheral side, matching the taper mounting 11 of the stretching slide 6, for example to be able to position the stretching rod 4 with the disk 25 in a predetermined rotational orientation in the stretching slide 6. The base part 14 of the stretching slide 6 is embodied to match the linear guidance 13 and is guided on the linear guidance 13, for example, via maintenance-free and lubricant-free linear sliding bearings (not shown). These linear sliding bearings can be provided in the base part 14 and/or at the linear guidance 13. The linear guidance 13 is, for example, a T-shaped rail screwed with a curved base part at the bearing support 1, so that altogether a kind of dovetailed guidance is provided.

Figure 4:
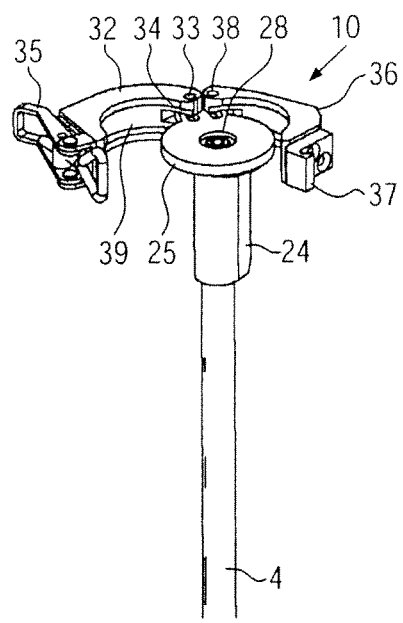
FIG. 4 shows a perspective representation of a detail of a stretching rod quick change device.

FIG. 4 illustrates an embodiment of the stretching rod 4 with the fitting sleeve 24 and the disk 25 fixed on it by means of the straining screw 28. The clamping element 10 is in this embodiment mounted at a peripheral position at the disk 25 and embodied like a straining ring with a dead-center exceeding clamp clip 35 and consists at least of two pieces. A first clamp clip half 32 is arranged at a peripheral projection 34 of the disk 25 by means of a swivel bolt 33 so it can swivel and supports the dead-center exceeding clamp clip 35. Next to it, a second clamp clip half 36 is mounted with a swivel pin 38. The second clamp clip half 36 supports an abutment 37 for the dead-center exceeding clamp clip 35. As mentioned, each clamp clip half 32, 36 is embodied inside with taper surfaces 39 which match the taper surfaces 30, 31 of the male taper pieces 21, 22 in FIG. 2 to clamp the disk 25 free from backlash and in a centered manner.

In a not shown alternative embodiment, the clamping element 10 could have a different design and/or be attached to the male taper piece 21 or 22. It is furthermore possible to embody the clamping element 10 as an independent component which is removed and then attached again during a change of the stretching rod.

Figure 6:
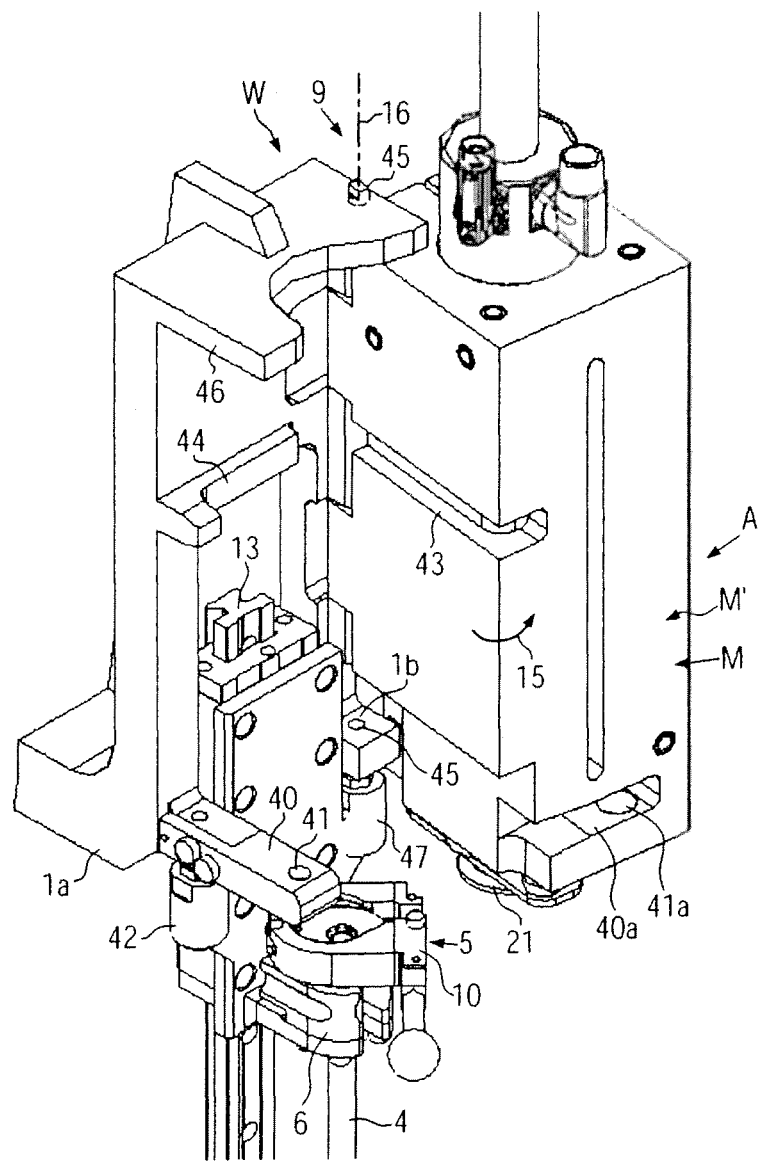
FIG. 6 shows a view similar to that of FIG. 5, however after the stretching rod quick change device has been transferred to the change position.

FIGS. 5 and 6 illustrate the transfer of the stretching rod quick change device W between the operating position (FIG. 5) and the change position (FIG. 6) with reference to the embodiment in which the servomotor M is a linear motor 2.

In FIG. 6, the swivel axis 16 is defined by swivel pins 45 in a bent upper part 46 of the bearing support top part 1a and the holder 47 at the bearing support top part 1a. The servomotor M has been swiveled to the change position about this swivel axis 16 in the direction of the arrow 15. The anti-swivel protection with the extension 40 and the locking mechanism 41 has come out of the indentation 40a in FIG. 6 after the locking mechanism 41 has been released, for example, by the opening 41a, so that the servomotor M of the drive unit A could be swiveled by about 90°, i.e. in any case by a radian measure at least corresponding to the outer diameter of the male taper piece 21 to completely free the clamping element 10 which is shown in its closed state in FIG. 6. For the male taper piece 21 to be able to exit from the clamping element 10 without obstructions, the clamp clip halves 32, 36 have been swiveled apart beforehand.

Not only the upper part 46 which grips over the servomotor M at the top, but also the projection 40 which engages in the indentation 40a, as well as preferably a rib 44 at the bearing support top part 1a which engages in a corresponding indentation 43, serve the axial locking of the servomotor M in the operating position in FIG. 5. With these measures, the reaction forces occurring in the positioning of the stretching rod 4 and mainly acting in the direction of the axis of the stretching rod 4 are over a large-surface transmitted into the bearing support 1 or the bearing support top part 1a, respectively.

For preventing the stretching slide 6 with the stretching rod 4 from sinking on the linear guidance 13 under its own weight in the change position in FIG. 6 and after the coupling 5 has been disconnected, a catch device 42 is suitably provided which holds the stretching slide 6 during the change of the stretching rod. This is, for example, at least one permanent magnet which magnetically acts at the stretching slide 6 in a previously adjusted upper end position of the latter, or it is a non-depicted locking stop which is released again upon completion of the change of the stretching rod. In the transfer from the operating position (FIG. 5) to the change position (FIG. 6), the clamping element 10 is of course first opened to such an extent that the male taper piece 21 can exit at the rotor 3 in the direction of the arrow 15 without obstructions.

For a change of the stretching rod, in FIG. 5 first the clamping element 10 is opened until the male taper piece 21 is freed for exiting. Then, the anti-swivel protection 40, 41 is released and the servomotor M and the drive unit A, respectively, are swiveled to the change position (FIG. 6) in the direction of the arrow 15. During the release of the clamping element 10, the elastic element 26 can optionally somewhat lift the disk 25 with the stretching rod 4 in the taper mounting 11 of the stretching slide, so that the stretching rod 4 is free for being removed in the direction of change 23. Otherwise, one acts for example through the slot 12 of the stretching slide 6 at the fitting sleeve 24 to slightly lift the (optionally slightly conical) fitting sleeve 24 from its centered position and free the stretching rod 4. Then, the stretching rod 4 is pulled upwards, for example by means of the clamping element 10, until it comes free with its lower end and can be removed laterally. Subsequently, another stretching rod 4 is inserted which is equipped with the same fitting sleeve 24 and disk 25. The latter is first pushed downwards onto the male taper piece 22 at the stretching slide 6 while the clamping element 10 is opened and then placed onto the elastic element 26 with the disk 25. Subsequently, the servomotor M is swiveled again from the change position (FIG. 6) in the opposite direction of the arrow 15 into the operating position (FIG. 5) about the swivel axis 16 and fixed with the anti-swivel protection 40, 41, where the lower end of the male taper piece 21 enters the opened clamping element 10 and is first roughly aligned with the male taper piece 22. By closing the clamping element 10, the two male taper pieces 21, 22 are precisely centered relative to each other free from backlash and pressed onto the disk 25, where the elastic element 26, if it is provided, is compressed until the dead-center exceeding clamp clip (FIG. 4) hung up behind the abutment 37 is finally closed and restores the centering free from backlash. Then, the blow molding station is again functionally ready for the production operation.

In case of a servomotor M as rotary motor which is coupled for example with the stretching slide 6 via a screw spindle supported in the bearing support 1, 1a, the rotary motor and the screw spindle are displaced to the change position on the path of movement in the direction of change 23 of the stretching rod 4 out of its path of movement (not shown).

If the servomotor M is combined with a pneumatic cylinder or an energy storage mechanism to compensate force peaks, the energy storage mechanism or the pneumatic cylinder are optionally also displaced to the change position together with the servomotor. As a further option, a rotational locking could be provided to temporarily fix the servomotor M in the change position (FIG. 6), for example between the upper part 46 and the upper end of the servomotor M or the heat sink M', respectively. If the stretching rod quick change device W is designed to be automatically operated by an actuator, corresponding actuators for the release of the clamping element 10 and/or the unlocking of the anti-swivel protection 40, 41 and for swiveling the servomotor M could be provided for example at the bearing support, for example pneumatic cylinders or the like, so that a change of the stretching rod can be prepared by remote control.

The invention claimed is:

1. Stretch-blow molding machine for manufacturing containers from preforms, comprising at least one blow molding station, at least one stretching rod with a drive unit connected at a bearing support of the blow molding machine, the drive unit comprising an electric servomotor coupled to a stretching slide in which the stretching rod is placed for transmitting linear movements to the stretching rod for electrically stretching the respective preform, the stretching rod is configured to be changeable in a defined, at least approximately axial direction of the stretching rod during a stretching rod change step, a stretching rod quick change device including a releasable coupling provided in the blow molding station, the stretching rod quick change device being adapted to be transferred between a centered operating position and a stretching rod change position, wherein in the centered operating position of the stretching rod quick change device the stretching rod is placed in the stretching slide in a taper mounting, and wherein mutually aligned muff-like male taper pieces are arranged at the drive unit and at the stretching slide between which a stretching rod head portion is clamped by means of a releasable clamping element acting at the male taper pieces.

2. Stretch-blow molding machine according to claim 1, wherein for transferring the stretching rod quick change device to the stretching rod change position, the releasable coupling is released and the drive unit is mounted at the bearing support to be displaced out of the axial path of movement of the stretching rod to be changed.

3. Stretch-blow molding machine according to claim 1, wherein the stretching rod quick change device can be transferred either manually or partially manually and partially operated by an actuator, or automatically operated by an actuator.

4. Stretch-blow molding machine according to claim 1, an assembly means including a releasable drive unit locking means is provided at the bearing support securing the drive unit in an engaged condition against folding, swiveling or shifting.

5. Stretch-blow molding machine according to claim 1, wherein with the stretching rod head portion is clamped by means of the releasable clamping element, at least one elastic connecting member is clamped between the stretching rod head portion and one of the male taper pieces.

6. Stretch-blow molding machine according to claim 1, wherein the clamping element includes at least two-piece quick acting ring equipped with a clamp clip.

7. Stretch-blow molding machine according to claim 1, wherein the stretching rod head portion comprises a disk mounted on the stretching rod end, and wherein the clamping element is mounted to the disk.

8. Stretch-blow molding machine according to claim 1, wherein the drive unit and one of the male taper pieces are displaceable from the operating position by at least half of an outer diameter of the male taper piece into a laterally displaced change position relative to the stretching rod axis.

9. Stretch-blow molding machine according to claim 1, wherein the servomotor is a linear motor with a rotor located in the operating position of the electric servomotor either coaxial to the stretching rod axis or laterally offset relative to the stretching rod axis by no more than 100 mm, the rotor being coupled to the stretching rod or the stretching slide, respectively, directly or via an extension.

10. Stretch-blow molding machine according to claim 4, wherein a swivel axis for the drive unit including the electric servomotor is arranged at the bearing support, parallel to the stretching rod and laterally offset with respect to the stretching rod, and wherein the releasable drive unit locking means is mounted at the bearing support at a side opposite to the swivel axis with respect to the stretching rod.

11. Stretch-blow molding machine according to claim 1, wherein a stretching slide catching device is provided at the bearing support and positioned in an upper end of the stretching slide, the stretching slide catching device holds the stretching slide one of directly or indirectly against a movement in a direction opposite to the direction of change of the stretching rod and with the releasable coupling released.

12. Stretch-blow molding machine according to claim 4, wherein the releasable drive unit locking means has a swivel axis at the bearing support being one of parallel, perpendicular, or diagonal relative to the direction of the axis of the stretching rod.

13. Stretch-blow molding machine according to claim 5, wherein the at least one elastic connecting member is an elastomer ring.

14. Stretch-blow molding machine according to claim 7, wherein the disk is mounted on the stretching rod end via a fitting sleeve placed onto the stretching rod end and fitting into a top mounting of the stretching slide.

15. Stretch blow molding machine according to claim 11, wherein the stretching slide catching device comprises at least one permanent magnet.

* * * * *